United States Patent
Shen (10) Patent No.: US 11,303,567 B2
(45) Date of Patent: Apr. 12, 2022

(54) METHOD AND DEVICE FOR DETERMINING AND SENDING PRIORITY OF PACKET, AND ROUTING SYSTEM

(71) Applicant: ZTE Corporation, Shenzhen (CN)

(72) Inventor: Yiming Shen, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/055,645

(22) PCT Filed: Feb. 21, 2019

(86) PCT No.: PCT/CN2019/075748
§ 371 (c)(1),
(2) Date: Nov. 16, 2020

(87) PCT Pub. No.: WO2019/218740
PCT Pub. Date: Nov. 21, 2019

(65) Prior Publication Data
US 2021/0226894 A1    Jul. 22, 2021

(30) Foreign Application Priority Data

May 16, 2018 (CN) .......................... 201810468603.2

(51) Int. Cl.
*H04L 12/741* (2013.01)
*H04L 45/74* (2022.01)
(Continued)

(52) U.S. Cl.
CPC .............. *H04L 45/74* (2013.01); *H04L 45/24* (2013.01); *H04L 45/44* (2013.01); *H04L 61/103* (2013.01); *H04L 61/6022* (2013.01)

(58) Field of Classification Search
CPC ... H04L 45/74; H04L 61/6022; H04L 61/103; H04L 45/24; H04L 45/44
See application file for complete search history.

(56) References Cited

U.S. PATENT DOCUMENTS 6,917,614 B1 * 7/2005 Laubach ............. H04L 12/2801
370/392
7,760,722 B1 * 7/2010 Tripathi ............. H04L 63/1458
370/389
(Continued)

FOREIGN PATENT DOCUMENTS

CN    102130776 A    7/2011
CN    104754070 A    7/2015
(Continued)

OTHER PUBLICATIONS

International Search Report for corresponding application PCT/CN2019/075748 filed Feb. 21, 2019; dated May 6, 2019.
(Continued)

*Primary Examiner* — Jimmy H Tran
(74) *Attorney, Agent, or Firm* — Cantor Colburn LLP (57) ABSTRACT

Provided are a method and a device for determining and sending a priority of a packet, and a routing system. The method comprises: receiving an ARP packet; determining the white list protection entry of the ARP packet according to the dynamic routing protocol subscription information. By means of the present disclosure, the technical problem in the related art that the ARP packet cannot be interacted normally due to an ARP attack is solved.

12 Claims, 6 Drawing Sheets

(51) Int. Cl.
  *H04L 45/24* (2022.01)
  *H04L 45/44* (2022.01)
  *H04L 61/103* (2022.01)
  *H04L 101/622* (2022.01)

(56) References Cited

U.S. PATENT DOCUMENTS

| | | | | |
|---|---|---|---|---|
| 7,796,614 | B1* | 9/2010 | Weymans | H04L 45/02 370/396 |
| 8,635,284 | B1* | 1/2014 | Tripathi | H04L 69/161 709/206 |
| 8,812,730 | B2* | 8/2014 | Vos | H04L 29/12547 709/245 |
| 2003/0165160 | A1* | 9/2003 | Minami | H04L 69/161 370/466 |
| 2005/0060535 | A1* | 3/2005 | Bartas | H04L 63/145 713/154 |
| 2006/0088037 | A1* | 4/2006 | Finley | H04L 61/10 370/395.54 |
| 2006/0209818 | A1* | 9/2006 | Purser | H04L 29/12009 370/389 |
| 2007/0192858 | A1 | 8/2007 | Lum | |
| 2007/0261112 | A1* | 11/2007 | Todd | G06F 21/577 726/11 |
| 2008/0008210 | A1* | 1/2008 | Godlewski | H04L 12/2801 370/463 |
| 2008/0144532 | A1* | 6/2008 | Chamarajanagar | H04L 69/40 370/255 |
| 2010/0121981 | A1* | 5/2010 | Drako | H04L 63/0245 709/245 |
| 2011/0216770 | A1* | 9/2011 | Wu | H04L 12/56 370/392 |
| 2014/0022936 | A1* | 1/2014 | Robitaille | H04L 61/2007 370/254 |
| 2014/0195666 | A1* | 7/2014 | Dumitriu | H04L 49/70 709/223 |
| 2014/0304776 | A1* | 10/2014 | Strebe | H04L 63/20 726/3 |
| 2016/0065501 | A1* | 3/2016 | Watanabe | H04L 41/08 370/392 |
| 2016/0164896 | A1* | 6/2016 | Baldonado | H04L 63/1425 726/23 |
| 2016/0301655 | A1* | 10/2016 | Lim | H04L 61/6009 |
| 2017/0093910 | A1* | 3/2017 | Gukal | H04L 63/1425 |
| 2018/0013674 | A1* | 1/2018 | Nainar | H04L 45/32 |
| 2018/0027012 | A1* | 1/2018 | Srinivasan | H04L 63/101 726/4 |
| 2018/0145986 | A1* | 5/2018 | Chien | H04L 63/0236 |
| 2018/0254941 | A1* | 9/2018 | Kanaya | H04L 29/12009 |
| 2019/0104107 | A1* | 4/2019 | Da Silva Peixoto | H04L 63/02 |

FOREIGN PATENT DOCUMENTS

| | | |
|---|---|---|
| CN | 105262738 A | 1/2016 |
| CN | 107241313 A | 10/2017 |
| CN | 107332773 A | 11/2017 |
| CN | 107690004 A | 2/2018 |
| KR | 102098029 B1 | 12/2011 |

OTHER PUBLICATIONS

Cheshire Apple Computer B Aboba Microsoft Corp, Dynamic Configuration of IPv4 Link-Local Addresses, May 1, 2005, XP015054862.

European Search Report for corresponding application EP 19803990: Report dated Feb. 18, 2021.

* cited by examiner

METHOD AND DEVICE FOR DETERMINING AND SENDING PRIORITY OF PACKET, AND ROUTING SYSTEM

TECHNICAL FIELD

The present disclosure relates to the field of communications, and in particular, to a method and device for determining and sending a priority of a packet, and a routing system.

BACKGROUND

In the related art, when the router devices (IP forwarding devices) are connected via Ethernet, if a sender (a source device) wants to transmit data to a directly connected receiver (a target device) in a point-to-point manner, it is required to learn a layer 2 Media Access Control (MAC) address of the direct IP address corresponding to the receiver device. MAC address learning needs to be implemented through an Address Resolution Protocol (ARP). Hence, ARP is the basis of Ethernet unicast communication.

In the related art, the router device needs to work normally to implement layer-3 forwarding such as IP, which requires a route. However, most of these routes are generated by routing protocol learning, and it can be said that the routing protocol is the basis of a router. Each routing protocol has a certain keep-alive interactive mechanism. That is, a router periodically sends a keep-alive packet to a peer end to inform a working state the router, so that the peer end synchronizes routing information to the router in real time. It is obvious that the keep-alive of the routing protocol is quite important for the core node router, which is similar to the "heartbeat" of the router. In addition, the routing path information delivery of routing protocol is also very important, similar to the "blood" of routers.

A routing protocol is based on unicast point-to-point communication. When a keep-alive packet and an information packet of the routing protocol are borne on an Ethernet (ETH) link, a unicast communication basis thereof is having an MAC of the IP address of an opposite end, and the MAC learning is implemented by means of an ARP protocol. In addition, the learned ARP entries also needs to be refreshed periodically by packet; otherwise, the ARP entries will be aged; and after the aging time, even if a transient ARP failure occurs, the impact on a core node router is also great, it is similar to a "myocardial infarction", the impact may be fatal.

Network attacks happen all the time, and among various attacks, the ARP attack is a typical attack. For an ARP attack, if measures are not taken, the router will be greatly affected; if the ARP for routing protocol interaction mentioned above is invalid, the influence on the router of the core node is fatal, which may result in the protocol links broken, and tens of thousands of users communication is interrupted within a short or long time.

Concerning the above described problems existing in the related art, no effective solution has been provided till now.

SUMMARY

Embodiments of the present disclosure provide a method and a device for determining and sending a priority of a packet, and a routing system.

According to an embodiment of the present disclosure, provided is a method for determining a priority of a packet, comprising: receiving an address resolution protocol (ARP) packet; and determining the white list protection entry of the ARP packet according to the dynamic routing protocol subscription information.

According to an embodiment of the present disclosure, provided is a method for sending a priority of a packet, comprising: acquiring an ARP packet to be sent; determining a white list protection entry of the ARP packet according to dynamic routing protocol subscription information; sending the ARP packet.

According to another embodiment of the present disclosure, a device for determining a priority of a packet is provided, comprising: a receiving module, configured to receive an ARP packet; and a determining module, configured to determine the white list protection entry of the ARP packet according to the dynamic routing protocol subscription information.

According to another embodiment of the present disclosure, a packet priority sending device is provided, comprising: an acquisition module configured to acquire an ARP packet to be sent; a generation module, configured to determine a white list protection entry of the ARP packet according to dynamic routing protocol subscription information; and a sending module, configured to send the ARP packet.

According to another embodiment of the present disclosure, provided is a routing system, comprising: a first routing device and a second routing device. The first routing device comprising: an acquisition module, configured to acquire an ARP packet to be sent; a first white list generation module, configured to determine the white list protection entry of the ARP packet according to the dynamic routing protocol subscription information, and the sending module, configured to send the ARP packet. The second routing device comprises: a receiving module, configured to receive the ARP packet; and a second white list generation module, configured to determine the white list protection entry of the ARP packet according to dynamic routing protocol subscription information.

The embodiments of the present disclosure also provide a storage medium, in which a computer program may be stored, the computer program being configured to run to execute the network topology division method provided in the embodiments of the present disclosure.

The embodiments of the present disclosure also provide an electronic device, which may include a memory and a processor. A computer program may be stored in the memory. The processor may be configured to run the computer program to execute the network topology division method provided in the embodiments of the present disclosure.

In the above embodiments of the present disclosure, the white list protection entry of the ARP packet is generated based on the subscription information. Therefore, the priority information of the ARP packet can be determined, the attack ARP packet and the legal ARP packet can be effectively distinguished, and the legal ARP interaction packet subscribed by the routing protocol is ensured to be processed normally. Thus, it is ensured that the routing protocol can interact normally, and the technical problem in the related art that the ARP packet cannot be interacted normally due to the ARP attack can be solved.

BRIEF DESCRIPTION OF THE DRAWINGS

Drawings, provided for further understanding of the present disclosure and forming a part of the description, are used to explain the present disclosure together with embodiments of the present disclosure rather than to limit the present disclosure. In the drawings.

DETAILED DESCRIPTION OF THE EMULSIONS

The present disclosure will be described below with reference to the drawings and in combination with the embodiments in detail. It is to be noted that the embodiments in the present application and characteristics in the embodiments may be combined without conflicts.

It is to be noted that the terms like "first" and "second" in the specification, claims and accompanying drawings of the present disclosure are used for differentiating the similar objects, but do not have to describe a specific order or a sequence.

Embodiment 1

Figure 1:
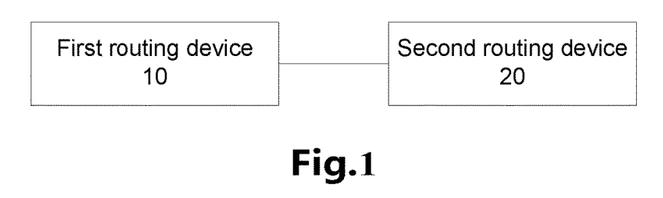
FIG. 1 is a diagram of network architecture according to an embodiment of the present disclosure.

An embodiment of the present disclosure may run on the network architecture shown in FIG. 1. FIG. 1 is a network architecture diagram of an embodiment of the present disclosure. As shown in FIG. 1, the network architecture includes: a first routing device 10 and a second routing device 20, wherein packets receiving and sending are performed between the first routing device and the second routing device.

Figure 2:
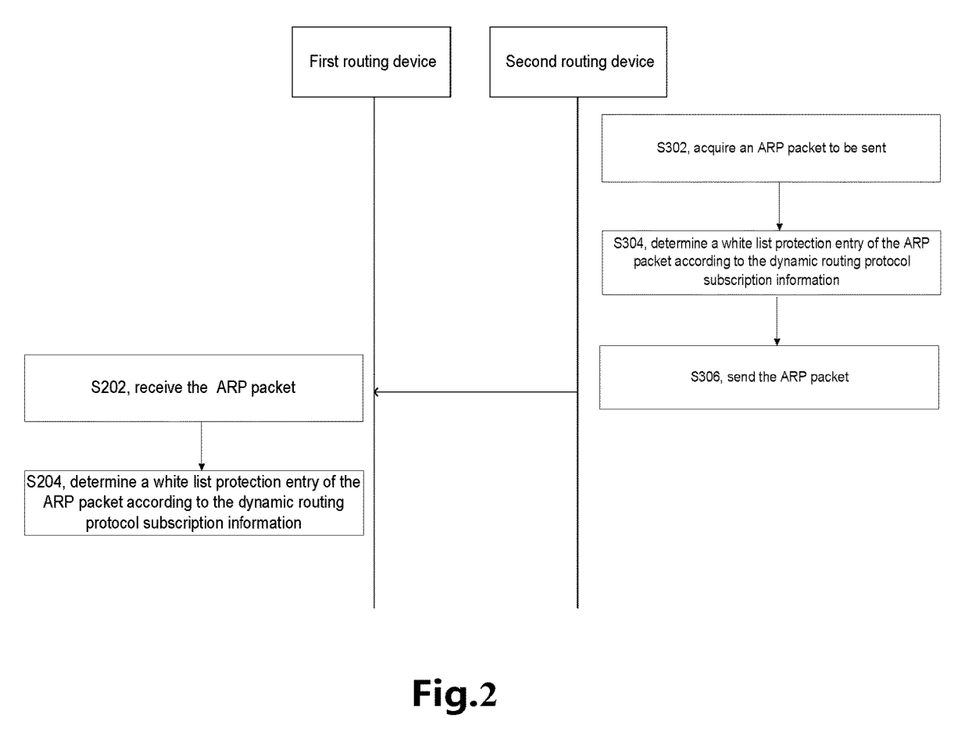
FIG. 2 is a flowchart of packet interaction according to an embodiment of the present disclosure.

The embodiment provides a method for determining the priority of a packet, and the method is implemented on the described network architecture. FIG. 2 is a flowchart of packet interaction according to the embodiment of the present disclosure. As shown in FIG. 2, the flow comprises the following steps:

Step S202, receiving an ARP packet; and

Step S204: determining the white list protection entry of the ARP packet according to the dynamic routing protocol subscription information.

Through the above steps, the dynamic routing protocol subscription information is used to generate a white list protection entry for determining an ARP packet. Therefore, the priority information of the ARP packet can be determined, the attack ARP packet and the legal ARP packet can be effectively distinguished, and the legal ARP interaction packet subscribed by the routing protocol is ensured to be processed normally. Thus, it is ensured that the routing protocol can interact normally, and the technical problem in the related art that the ARP packet cannot be interacted normally due to the ARP attack can be solved.

In an embodiment, the entity for performing the above steps can be a packet receiving end, such as a router or a switch, but is not limited thereto.

In an embodiment, before determining the white list protection entry of the ARP packet according to the dynamic routing protocol subscription information, the method further comprises: setting dynamic routing protocol subscription information.

In an embodiment, the dynamic routing protocol subscription information includes source address information, destination address information and interface information. The address information may be an IP address, a MAC address, or the like, and the interface may be an ingress interface.

In this embodiment, determining the white list protection entry of the ARP packet according to the dynamic routing protocol subscription information comprises:

S11, parsing key value information about a first ARP packet in the ARP packet, wherein the key value information comprises source address information, destination address information and interface information; the first ARP packet may be any of the received ARP packets;

S12, querying whether the key value information matches the dynamic routing protocol subscription information; determining whether the key value information of the received first ARP packet matches the key value of dynamic routing protocol subscription information; and S13, when the key value information matches the dynamic routing protocol subscription information, determining that the white list protection entry includes the first ARP packet, wherein the priority of the white list protection entry is higher than a default priority. If yes, it may be a match or a plurality of matches, and if yes, it is confirmed that the ARP packet is an ARP packet with a high priority, the ARP packet may be selected and filtered preferentially, and the next processing is performed.

The present embodiment provides a method for sending a packet priority, and the method is implemented on the above described network architecture. FIG. 2 is a flowchart of message interaction according to an embodiment of the present disclosure. As shown in FIG. 2, the flow further comprises the following steps:

Step S302, acquiring an ARP packet to be sent;

Step S304, determining a white list protection entry of the ARP packet according to the dynamic routing protocol subscription information; and Step S306: sending the ARP packet.

In an embodiment, the entity for executing the foregoing steps may be a packet sending end, such as a router or a switch, but is not limited thereto.

In an embodiment, after generating the white list protection entry of the ARP packet according to the dynamic routing protocol subscription information, the method further comprises at least one of the following: rechecking the MAC address of the white list protection entry; and disabling the ARP keep-alive function of the white list protection entry within a predetermined time.

In an embodiment, the step of determining a white list protection entry of the ARP packet according to the dynamic routing protocol subscription information comprises: when key value information of the first ARP packet in the ARP packet matches the dynamic routing protocol subscription information, and adding the first ARP packet to the white list protection entry, wherein the priority of the white list protection entry is higher than a default priority.

In an embodiment, sending the ARP packet comprises: using a pre-set priority to send the ARP packets in the white list protection entry, and the remaining ARP packets being normally sent. Therefore, ARP packets may be sent at a high priority.

Through the above descriptions about the implementation modes, those skilled in the art may clearly know that the methods according to the embodiment may be implemented in a manner of combining software and a required universal hardware platform and, of course, may also be implemented through hardware, but the former is a preferred implementation mode under many circumstances. Based on such an understanding, the technical solutions of the present disclosure substantially or parts making contributions to a conventional art may be embodied in form of a software product. The computer software product is stored in a storage medium (for example, a Read-Only Memory (ROM)/Random Access Memory (RAM), a magnetic disk and an optical disk), including a plurality of instructions configured to enable a terminal device (which may be a mobile phone, a computer, a server, a network device or the like) to execute the method of each embodiment of the present disclosure.

Embodiment 2

The embodiments of the present disclosure further provide devices for determining and sending the priority of a packet. The devices are used for implementing the described embodiment and example implementation mode, and what has been described will not be elaborated. The term "module", as used hereinafter, is a combination of software and/or hardware capable of realizing a predetermined function. Although the device described in the following embodiment is preferably implemented by software, implementation of hardware or a combination of software and hardware is also possible and conceived.

Figure 3:
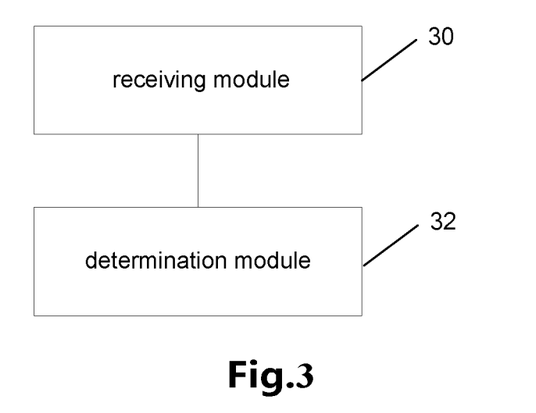
FIG. 3 is a structural block diagram of a device for determining a priority of a packet according to an embodiment of the present disclosure.

FIG. 3 is a structural block diagram of a device for determining a priority of a packet according to an embodiment of the present disclosure. As shown in FIG. 3, the device includes:

a receiving module 30, configured to receive an ARP packet; and a determining module 32, configured to determine the white list protection entry of the ARP packet according to the dynamic routing protocol subscription information.

In an embodiment, the determination module comprises: a parsing unit, configured to parse key value information about a first ARP packet in the ARP packet, wherein the key value information comprises source address information, destination address information and interface information; a query unit, configured to query whether the key value information matches the dynamic routing protocol subscription information; and a determination unit, configured to determine that the white list protection entry comprises the first ARP packet when the key value information match the dynamic routing protocol subscription information, wherein the priority of the white list protection entry is higher than a default priority.

Figure 4:
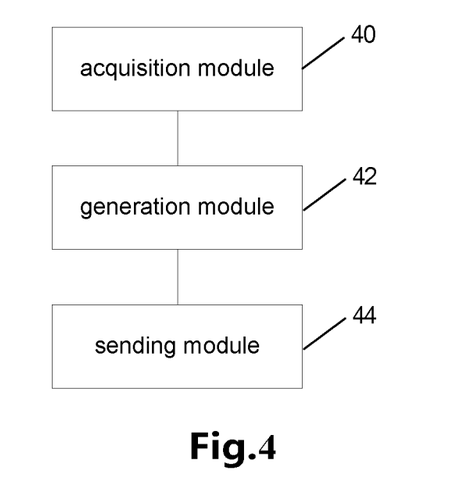
FIG. 4 is a structural block diagram of a device for sending a priority of a packet according to an embodiment of the present disclosure.

FIG. 4 is a structural block diagram of a device for sending a priority of a packet according to an embodiment of the present disclosure. As shown in FIG. 4, the device includes:

an acquisition module 40, configured to acquire an ARP packet to be sent;

a generation module 42, configured to determine a white list protection entry of the ARP packet according to the dynamic routing protocol subscription information; and a sending module 44, configured to send the ARP packet.

In an embodiment, the generation module 42 further comprises: a generation unit, configured to add the first ARP packet to the white list protection entry when the key value information of the first ARP packet in the ARP packet matches the dynamic routing protocol subscription information, wherein the priority of the white list protection entry is higher than a default priority.

In an embodiment of the present disclosure, a routing system is further provided. The routing system comprises: a first routing device and a second routing device. The first routing device comprises: an acquisition module, configured to acquire an ARP packet to be sent; a first white list generation module, configured to determine the white list protection entry of the ARP packet according to the dynamic routing protocol subscription information; and a sending module, configured to send the ARP packet; the second routing device comprises: a receiving module, configured to receive the ARP packet; and a second white list generation module, configured to determine a white list protection entry of the ARP packet according to the dynamic routing protocol subscription information.

It is to be noted that each module may be implemented through software or hardware and, under the latter condition, may be implemented in, but not limited to, the following manner: the modules are all positioned in the same processor, or the modules are positioned in different processors in any combination form respectively.

Embodiment 3

In this embodiment, an ARP recognition and protection method and device (system) based on routing protocol subscription are provided, which are applicable to an ARP attack scenario. The device can effectively distinguish an attack ARP packet from a legal ARP packet, and ensure normal processing of a legal ARP interaction packet subscribed by a routing protocol, thereby ensuring normal interaction of the routing protocol.

The present embodiment relates to ARP recognition and protection method and device (system) based on routing protocol subscription, such as a routing device, comprising the following components:

Component A—a route-related component: responsible for tasks such as route establishment, keep-alive, and route advertisement.

Component B—ARP related component: responsible for tasks such as maintaining and refreshing an ARP entry and sending a keep-alive packet; a keep-alive packet is a form of packet interaction in the field of communications. The two communication parties agree to continuously send information about themselves to each other in a period, so as to prove that the communication states of themselves are normal. Otherwise, if the keep-alive packet of the other communication party cannot be received in several periods, it indicates that the communication is abnormal, and the communication party which does not receive the keep-alive information may take certain measures such as an active disconnection.

Component C—routing and ARP interactive subscription component.

Figure 5:
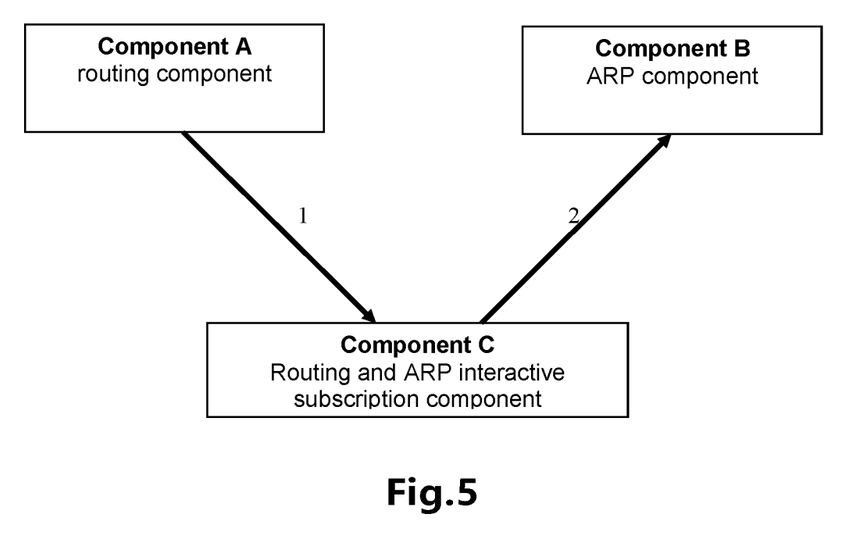
FIG. 5 is a schematic diagram illustrating the route and ARP general interaction according to an embodiment of the present disclosure.

In an embodiment of the present disclosure, further provided is an ARP recognition protection device based on routing protocol subscription. FIG. 5 is a general interaction diagram of a routing and an ARP according to an embodiment of the present disclosure. Referring to FIG. 5, interaction between components includes the following steps:

Step 1, the component A transmits the route keep-alive packet or the next hop and outbound interface information for link establishment to component C; and Step 2, the component C receives the subscription information of the component A, performs some processing on the subscription information, then transmits the subscription information to the component B, and performs some guidance on the behaviors of the component B.

After receiving the subscription information of the component C, the ARP related component of the component B generates the following actions for the subscribed ARP entry:

1) In the packet receiving direction, generates a white list filter entry with a high priority for the subscribed ARP, so as to ensure that the subscribed ARP information can be filtered out precisely.

2) The subscribed ARP white list filtering entry can be used as a protection entry to prevent ARP information from being "illegally tampered".

3) The subscribed ARP white list filtering entry can act on the packet sending direction to ensure the packet sending priority.

In this embodiment, a routing device extracts ARP protection subscription information according to a routing protocol deployed on the router, and the key value of the ARP protection subscription information includes, but is not limited to, an egress interface, a next hop IP (source IP), and an interface IP (destination IP). Generating a high-priority ARP protection entry subscribed based on the routing protocol according to the subscription information. In this way, during ARP attack, the normal ARP may be filtered and protected with a high priority. The ARP entry of the route subscription is set as a "sensitive ARP" according to the subscription information, and the MAC modification is rechecked or the ARP keep-alive function is disabled temporarily. A high-priority delivery entry can be generated according to the subscription ARP entry, so as to send an ARP keep-alive packet of the subscription entry with a high priority.

The routing device applied in this embodiment may include the following modules:

A. Various routing protocol modules (including but not limited to: BGP, OSPF, ISIS, and LDP), all of which are standard protocols defined by RFC, configure to perform the routing packet interaction according to related conventions, generate routing information, and write the routing information to a routing table maintenance module. In addition, all these protocols have the keep-alive mechanism, and it is necessary to periodically transmit and receive keep-alive packets.

B. A routing table maintenance module, configured to perform organization and induction on a routing table generated by a routing protocol for an upper-layer application or a bottom-layer packet to perform routing lookup.

C. An ARP packet identifying and sending module, configured to identify a received ARP packet and package the ARP packet according to a priority and send the ARP packet to an ARP processing module.

D. An ARP processing module, the main function of which is as follows: 1) an ARP entry (a next hop IP address+a device interface and a corresponding MAC address) is generated according to a transmitted ARP packet; and 2) the ARP keep-alive packets for the generated ARP entry is regularly triggered. 3) If the upper layer application or the bottom layer packet finds that the corresponding ARP cannot be found, the sending of the ARP request message is triggered.

The routing device in this embodiment further includes the following modules:

E. a routing protocol ARP subscription module, configured to subscribe to an ARP entry used by a routing protocol (module A).

F. A subscribed ARP key value and table entry generation module, configured to generate a relevant key value and priority information of a routing protocol subscription ARP, and organize the relevant key value and priority information into a white list table entry for ARP identification, uploading, and issuing.

The following examples are described in detail for the BGP routing protocol subscribing to the ARP protection:

Example 1

Figure 6:
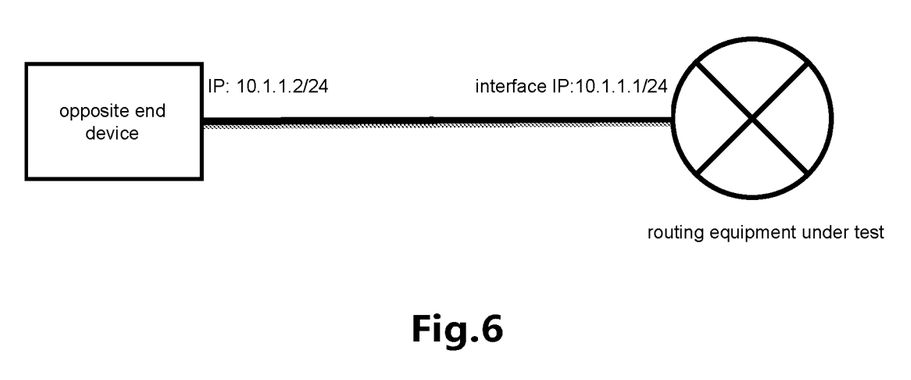
FIG. 6 is a schematic diagram of deployment and interaction according to Embodiment 1 of the present disclosure.

Routing and ARP linkage protection, FIG. 6 is a schematic diagram illustrating the deployment and interaction of route and ARP, with reference to FIG. 6. On the right side, it is a routing device under test, on the left side, it is a opposite end device connected to the routing device, and the two devices are connected through an ETH interface. The interface address of the routing device under test is 10.1.1.1/24, and the address of the opposite end device is 10.1.1.2/24. The two devices learn the ARP addresses of each other, and the keep-alive time is configured to be T1. A routing protocol such as BGP/various IGP/LDP is enabled between the routing device under test and the opposite end device. At the same time, large-capacity ARP attack packets are sent from the opposite end device, and the destination IP address, the source IP address, and the MAC address of the ARP attack packet can be generated randomly. In the related art (solutions of the present disclosure are not deployed), before the ARP aging time T1 arrives, the routing device under test or the opposite end device initiates ARP keep-alive or learning packets. However, due to a large number of ARP attacks packets, ARP of 10.1.1.2 on the routing device under test may not be normally processed, resulting in ARP failure. In this way, the routing protocol on the routing device under test is disconnected. Furthermore, when the ARP attack packet includes an address 10.1.1.2, the normal ARP of the device is tampered illegally, which also leads to link disconnection.

When the solution of this embodiment is deployed, a certain linkage and dependency relationship is generated between the route and the ARP, and under a same condition, the routing protocol is no longer broken due to the ARP attacks. That is, the ARP keep-alive or learning packets can be normally processed, and even if the attack ARP packet contains the address 10.1.1.2, ARP is no longer tampered illegally.

Example 2

Figure 7:
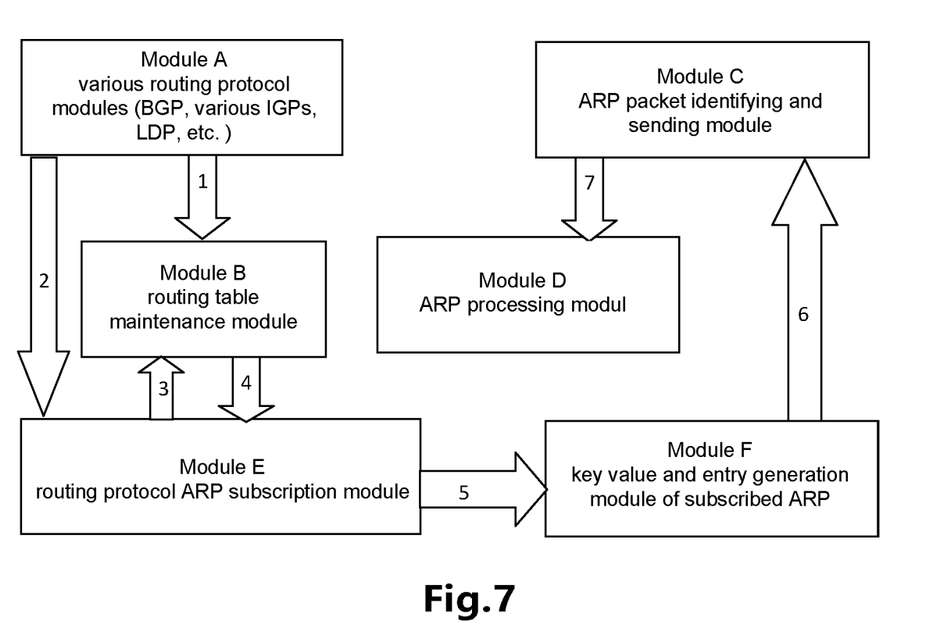
FIG. 7 is a schematic diagram of deployment and interaction according to a second embodiment of the present disclosure.

Direct connection neighbor subscription ARP packet receiving protection. FIG. 7 is a schematic diagram of deployment and interaction of embodiment 2 of the present disclosure, and as shown in FIG. 7.

Module A can be various types routing protocol modules, and when they work normally, various routing entries are generated, and these routing entries are the basis for the router to work. The various routing entries generated by the routing protocol will finally be sent to the routing table maintenance module of module B for unified maintenance and management (process 1). The BGP is taken as an example for implementation (the same applies hereinafter). Assume that in the BGP instance A, the IP address of the opposite end of the BGP instance A is a directly-connected V4 IP address: 10.1.1.2. Subscribing ARP protection for instance A.

The BGP instance A transmits the IP address 10.1.1.2 to the module E (process 2); after receiving the IP address, the routing protocol ARP subscription module of the module E first acquires the IP address 10.1.1.2 to the module B to perform a routing table (process 3); since the routing is a direct connection, the module B only returns an egress interface which is the interface I_1/1, but at the same time inform that the routing is a direct connection (process 4).

After receiving the information returned by module B, module E processes the information, for example, queries the IP address of interface I_1/1, assuming the IP address is 10.1.1.1, and then the related key value information about the subscribed ARP: the interface I_1/1, the destination IP 10.1.1.1, the source IP 10.1.1.2 and the protected priority information are sent to the module F (process 5).

The module F generates white list protection entry information according to the information received from the module E, writes and maintains the generated white list protection entry information, and sends the generated white list protection entry information to the ARP packet identifying and sending module of module C (process 6).

The common task of module C is to perform ARP recognition and reporting. Before a module writes a special protection ARP entry, for all ARPs the identification and processing performed by the module are equal. When an ARP attack with a large bandwidth occurs, because the bandwidth sent to the ARP processing module (process 7) of the module D is limited, the processing capability of the module D is also limited, and it cannot be ensured that the ARP of the routing protocol must be learnt and kept alive.

However, After module C receives the ARP protection information transmitted by module F (process 6), module C can classify the ARPs, ARPs satisfying the following three conditions are processed differently: (1) the ARP is received from the interface I_1/1; (2) the source IP address of the ARP request is 10.1.1.2 (3) the destination IP of the ARP request is 10.1.1.1. ensuring that such ARP packets are sent to the module D (process 7) with high priorities, and ensuring that the ARP module preferentially processes this type of ARP, in this way, it is ensured that the BGP instance A does not cause loss of the routing protocol keep-alive packet or the routing information interaction packet because the ARP keep-alive time aged or the ARP of 10.1.1.2 cannot be learned.

Example 3

Non-direct connection neighbors subscription ARP packet receiving protection, as shown in FIG. 7.

Assume that in the BGP instance A, the IP address of an opposite end of the BGP instance A is an indirect V4 IP address: 2.2.2.2. An ARP protection for instance A is subscribed.

The BGP instance A transmits an IP address 2.2.2.2 to a module E (process 2); after receiving the IP address, a routing protocol ARP subscription module of the module E first acquires the IP address 2.2.2.2 to a module B to perform routing table lookup (process 3); and in a normal condition, a route can be found, and the found information is returned to the module E (process 4), for example, an egress interface I_1/1 and a direct connection next hop IP 10.1.1.2.

In the present example, other following steps are the same as those in Example 1.

Example 4

Figure 8:
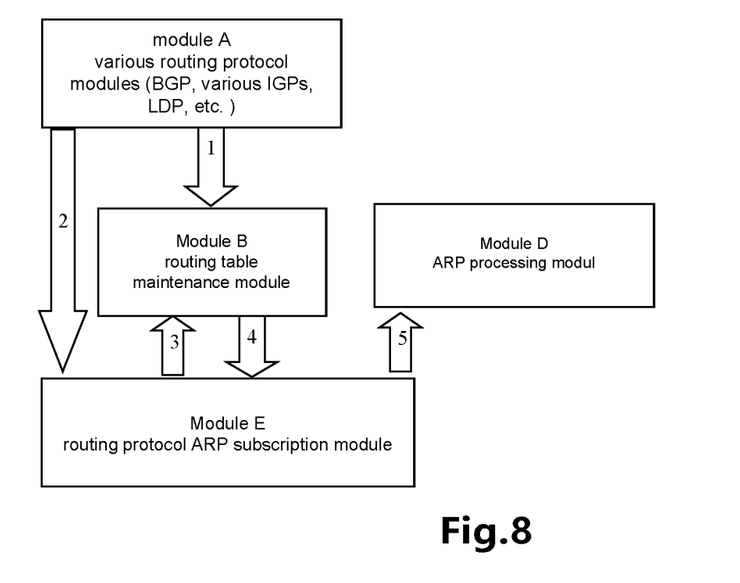
FIG. 8 is a schematic diagram of deployment and interaction according to a fourth embodiment of the present disclosure.

MAC tampering to protocol subscription ARP is rechecked. FIG. 8 is a schematic diagram of deployment and interaction according to Embodiment 4 of the present disclosure. As shown in FIG. 8.

As a variant of embodiment 3, the BGP instance A transmits the IP address 2.2.2.2 to the module E (process 2); after the module E receives the routing protocol ARP subscription module, the module E first acquires the IP address 2.2.2.2 to the module B to perform routing table lookup (process 3); under normal circumstances, the route can be found, and the found information is returned to the module E (process 4), for example, an egress interface I_1/1, directly connected to a next hop IP 10.1.1.2.

After receiving the returned information from module B, module E processes the information, for example, queries the IP address of interface I_1/1, for example, 10.1.1.1, and then the key value information of the related subscription ARP: interface I_1/1, destination IP10.1.1, source IP10.1.1.2 is forwarded to module D for tamper protection (process 5).

For those ARP request packets which are not received by the interface I_1/1 from the destination IP10.1.1.1 and the source IP10.1.1.2 are directly ignored and not responded.

for those ARP request packets satisfying the interface I_1/1, the destination IP 10.1.1.1 and the source IP 10.1.1.2, when it is found that the MAC corresponding to 10.1.1.2 is modified, the module D does not modify the MAC of 10.1.1.2 directly according to the received ARP packet, but performs a second check, and construct and send an ARP request packet of request 10.1.1.2.

Only when the ARP response packet which satisfies the interface I1.1/1, the destination IP10.1.1.1 and the source IP10.1.1.2 is received again, the ARP information of 10.1.1.2 is modified. In this way, it is ensured that the ARP entry is not tampered by the illegal ARP request.

Example 5

The protocol subscription ARP age to close, as shown in FIG. 8.

1. In the embodiment 4, after ARP processing module of the module D receives from the routing protocol ARP subscription module of the module B the key value subscription information: interface I_1/1, destination IP 10.1.1.1 and source IP 10.1.1.2, in addition to the tamper-proof protection, another group of optional actions may also be generated. For example, the ARP keep-alive of 10.1.1.2 on the interface 1/1 is temporarily closed, so that the ARP entry is permanently effective during the subscription period. In this way, the problem that the routing protocol on the interface is not broken due to ARP loss, etc., can be prevented.

Example 6

Figure 9:
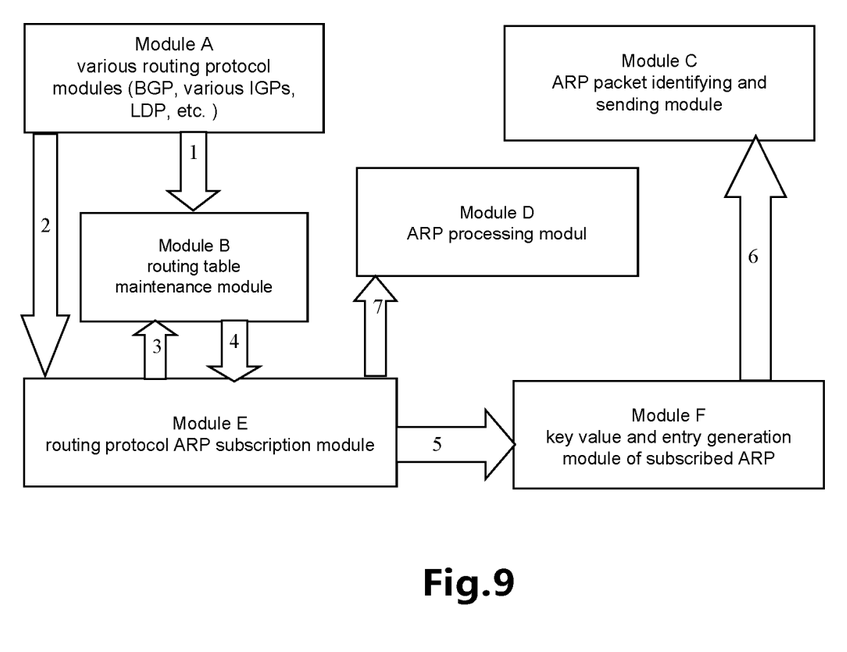
FIG. 9 is a schematic diagram of deployment and interaction according to Embodiment 6 of the present disclosure.

The ARP packets of protocol subscription ARP are sent preferentially. FIG. 9 is a schematic diagram of deployment and interaction according to Embodiment 6 of the present disclosure, referring to FIG. 9.

This embodiment is modified on the embodiment 2, the BGP instance A transmits the IP address 2.2.2.2 to the module E (process 2), and after receiving the IP address by the routing protocol ARP subscription module of the module E, the module E first acquires the IP address 2.2.2.2 to the module B to perform a routing table lookup (process 3), and normally the routing can be found, and the found information is returned to the module E (process 4), for example, an egress interface I_1/1 and a direct next-hop IP 10.1.1.2.

After receiving the returned information from module B, module E processes the information, for example, queries the IP address of interface I_1/1, for example, 10.1.1.1, and then the key value information of the related subscription ARP: interface I_1/1, destination IP 10.1.1.1, source IP 10.1.1.2 and the protected priority information are transmitted to module F (process 5).

Module F generates white list protection entry information according to the information received from module E, and performs writing and maintenance (process 6).

Module E simultaneously transmit the key value information of the related subscription ARP (including the interface I_1/1, the destination IP 10.1.1.1 and the source IP 10.1.1.2) to the module D for subscribing a high priority (the same procedure as the tamper-proof, process 7).

After the processes 6 and 7, the module D can endeavor to ensure a high priority when sending the ARP packet, and ensure that the opposite end can receive the ARP packet from the present end, the ARP response packet can be returned normally.

In the solution provided by this embodiment, ARP information subscription processing used by a routing protocol is processed by a component C, and a high-priority ARP protection entry subscribed by the routing protocol is generated. This can effectively protect the ARP keep-alive packet used in the routing protocol from being received and processed normally when the ARP attack occurs, thereby protecting the routing protocol from being link broken. By setting an ARP entry of a route subscription to be a "sensitive ARP" and performing a second check of MAC modification, a normal ARP address can be prevented from being tampered illegally when an ARP request attacks, thereby further providing a guarantee for the security of a routing protocol. By subscribing to an ARP entry, a high priority can be generated and kept alive, such an ARP request packet can also be sent preferentially to a certain degree, and an opposite end can be ensured to receive an ARP packet from the present end, thereby an ARP response packet can be normally replied.

Embodiment 4

Embodiments of the present disclosure further provide a storage medium. The storage medium stores a computer program, wherein the computer program is configured to execute the steps in any one of the method embodiments during running.

In an embodiment, in this embodiment, the storage medium may be configured to store a computer program for executing the following steps:

S1, receiving an ARP packet; and

S2, determining a white list protection entry of the ARP packet according to the dynamic routing protocol subscription information.

In this embodiment, the storage medium may include, but is not limited to, any medium that can store a computer program, such as a USB flash drive, a read-only memory (Read-Only Memory, ROM for short), a random access memory (Random Access Memory, RAM for short), a removable hard disk, a magnetic disk, or an optical disc.

An embodiment of the present disclosure also provides an electronic device, comprising a memory and a processor, wherein the memory stores a computer program, and the processor is configured to run the computer program so as to execute the steps in any of the above embodiments.

In an embodiment, the electronic device can further comprise a transmission device and an input/output device, wherein the transmission device is connected to the processor, and the input/output device is connected to the processor.

In this embodiment, the processor is configured to execute the following steps:

S1, receiving an ARP packet; and

S2, determining a white list protection entry of the ARP packet according to the dynamic routing protocol subscription information.

Alternatively, for specific examples in this embodiment, reference may be made to the examples described in the foregoing embodiments and optional implementations, and details are not repeatedly described herein in this embodiment.

Obviously, those skilled in the art should understand that each module or each step of the present disclosure may be implemented by a universal computing device, which may be concentrated on a single computing device or distributed on a network composed of a plurality of computing devices. In an embodiment, they may be implemented by program code executable by a computing device, and thus, they may be stored in a storage device and executed by the computing device. Furthermore, in some cases, the steps shown or described may be performed in an order different from that here, or they may be manufactured into individual integrated circuit modules, or a plurality of modules or steps thereof may be manufactured into individual integrated circuit modules. Thus, the present disclosure is not limited to any specific combination of hardware and software.

The above description is only the preferred embodiments of the present disclosure, and is not intended to limit the present disclosure. For those skilled in the art, the present disclosure may have various modifications and variations. Any modifications, equivalent replacements, improvements and the like made within the principle of the present disclosure shall belong to the protection scope of the present disclosure.

What is claimed is:

1. A method for determining a priority of a packet, comprising:
   receiving an address resolution protocol (ARP) packet; and
   determining a white list protection entry of the ARP packet according to dynamic routing protocol subscription information;
   wherein before determining the white list protection entry of the ARP packet according to the dynamic routing protocol subscription information, the method further comprises:
   setting the dynamic routing protocol subscription information;
   wherein determining the white list protection entry of the ARP packet according to the dynamic routing protocol subscription information comprises:
   parsing key value information about a first ARP packet in the ARP packet, wherein the key value information comprises source address information, destination address information and interface information;
   querying whether the key value information match the dynamic routing protocol subscription information; and when the key value information match the dynamic routing protocol subscription information, determining that the white list protection entry comprises the first ARP packet, wherein a priority of the white list protection entry is higher than a default priority.

2. The method as claimed in claim 1, wherein the dynamic routing protocol subscription information comprises:
source address information, destination address information and interface information.

3. An electronic device, comprising a memory and a processor, wherein the memory stores a computer program, and the processor is configured to run the computer program to execute the method as claimed in claim 2.

4. A non-transitory computer storage medium, wherein the non-transitory computer storage medium stores a computer program, and the computer program running to execute the method as claimed in claim 1.

5. An electronic device, comprising a memory and a processor, wherein the memory stores a computer program, and the processor is configured to run the computer program to execute the method as claimed in claim 1.

6. A method for sending a priority of a packet, comprising:
acquiring an address resolution protocol (ARP) packet to be sent;
determining a white list protection entry of the ARP packet according to dynamic routing protocol subscription information; and
sending the ARP packet;
wherein determining the white list protection entry of the ARP packet according to the dynamic routing protocol subscription information comprises:
adding a first ARP packet into the white list protection entry when key value information of the first ARP packet in the ARP packet matches the dynamic routing protocol subscription information, wherein a priority of the white list protection entry is higher than a default priority.

7. The method as claimed in claim 6, wherein after determining the white list protection entry of the ARP packet according to the dynamic routing protocol subscription information, the method further comprises at least one of:
rechecking an MAC address of the white list protection entry; and
disabling an ARP keep-alive function of the white list protection entry within a predetermined time.

8. An electronic device, comprising a memory and a processor, wherein the memory stores a computer program, and the processor is configured to run the computer program to execute the method as claimed in claim 7.

9. The method as claimed in claim 6, wherein sending the ARP packet comprises:
sending the ARP packet in the white list protection entry by using a preset priority.

10. An electronic device, comprising a memory and a processor, wherein the memory stores a computer program, and the processor is configured to run the computer program to execute the method as claimed in claim 9.

11. An electronic device, comprising a memory and a processor, wherein the memory stores a computer program, and the processor is configured to run the computer program to execute the method as claimed in claim 6.

12. A device for determining a priority of a packet, comprising a hardware processor and a memory, the hardware processor is configured to execute programming modules stored in the memory, and the programming modules comprise:
a receiving module, configured to receive an address resolution protocol (ARP) packet; and
a determining module, configured to determine a white list protection entry of the ARP packet according to dynamic routing protocol subscription information;
wherein the determination module comprises:
a parsing unit, configured to parse key value information of a first ARP packet in the ARP packet, wherein the key value information comprises source address information, destination address information and interface information;
a query unit, configured to query whether the key value information match the dynamic routing protocol subscription information; and
a determination unit, configured to determine that the white list protection entry comprises the first ARP packet when the key value information match the dynamic routing protocol subscription information, wherein a priority of the white list protection entry is higher than a default priority.

* * * * *